(12) United States Patent
Chen

(10) Patent No.: US 11,488,596 B2
(45) Date of Patent: Nov. 1, 2022

(54) METHOD AND SYSTEM FOR RECORDING AUDIO CONTENT IN A GROUP CONVERSATION

(71) Applicant: Hsiao-Han Chen, Tainan (TW)

(72) Inventor: Hsiao-Han Chen, Tainan (TW)

( * ) Notice: Subject to any disclaimer, the term of this patent is extended or adjusted under 35 U.S.C. 154(b) by 277 days.

(21) Appl. No.: 16/858,933

(22) Filed: Apr. 27, 2020

(65) Prior Publication Data

US 2020/0349941 A1 Nov. 5, 2020

(30) Foreign Application Priority Data

Apr. 30, 2019 (TW) ................................. 108115083

(51) Int. Cl.
*G10L 15/22* (2006.01)
*G10L 15/25* (2013.01)
*G10L 15/26* (2006.01)
*G06V 40/20* (2022.01)
*G06V 40/16* (2022.01)

(52) U.S. Cl.
CPC ............ *G10L 15/22* (2013.01); *G06V 40/172* (2022.01); *G06V 40/20* (2022.01); *G10L 15/25* (2013.01); *G10L 15/26* (2013.01); *G10L 2015/223* (2013.01)

(58) Field of Classification Search
CPC ...... G06V 40/172; G06V 40/20; G06V 40/28; G06V 40/70; G10L 15/22; G10L 15/25; G10L 15/26; G10L 2015/223; H04L 12/1831
See application file for complete search history.

(56) References Cited

U.S. PATENT DOCUMENTS

| | | | | |
|---|---|---|---|---|
| 7,117,157 | B1* | 10/2006 | Taylor | G06F 3/167 704/E15.041 |
| 8,811,626 | B2* | 8/2014 | Hata | G11B 20/10527 381/26 |
| 2011/0285807 | A1* | 11/2011 | Feng | G06V 40/161 704/E17.001 |
| 2012/0163625 | A1* | 6/2012 | Siotis | H04R 3/005 381/92 |
| 2018/0041519 | A1* | 2/2018 | Murrells | G06F 3/14 |

OTHER PUBLICATIONS

B. G. Gebre, P. Wittenburg and T. Heskes, "The gesturer is the speaker," 2013 IEEE International Conference on Acoustics, Speech and Signal Processing, 2013, pp. 3751-3755. (Year: 2013).*

* cited by examiner

*Primary Examiner* — Angela A Armstrong
(74) *Attorney, Agent, or Firm* — Osha Bergman Watanabe & Burton LLP

(57) ABSTRACT

A method for recording audio content in a group conversation among a plurality of members includes: controlling an image capturing device to continuously capture images of the members; executing an image processing procedure on the images of the members to determine whether a specific gesture is detected; when the determination is affirmative, controlling an audio recording device to activate and perform directional audio collection with respect to a direction that is associated with the specific gesture to record audio data; and controlling a data storage to store the audio data and a time stamp associated with the audio data as an entry of conversation record.

10 Claims, 4 Drawing Sheets

METHOD AND SYSTEM FOR RECORDING AUDIO CONTENT IN A GROUP CONVERSATION

CROSS-REFERENCE TO RELATED APPLICATION

This application claims priority of Taiwanese Patent Application No. 108115083, filed on Apr. 30, 2019.

FIELD

The disclosure relates to a method and a system for recording audio content in a group conversation.

BACKGROUND

Conventionally, audio content in a group conversation (e.g., a meeting, a conference, etc.) may be recorded by a person (e.g., a stenographer) who uses a typing machine or a computer to make a transcription of the audio content in the group conversation. Alternatively, an audio recording machine may be employed to record the audio content of the group conversation. For example, an omni-directional microphone may be disposed in the middle of a room in which the group conversation takes place for recording the audio content.

SUMMARY

Therefore, an object of the disclosure is to provide a method for recording audio content in a group conversation among a plurality of members.

According to one embodiment of the disclosure, the method is implemented by a system that includes a processor, an image capturing device, an audio recording device and a data storage. The method includes steps of:

a) controlling, by the processor, the image capturing device to continuously capture images of the members;

b) executing, by the processor, an image processing procedure on the images of the members to determine whether a specific gesture is detected;

c) when the determination of step b) is affirmative, controlling, by the processor, the audio recording device, to activate and perform unidirectional audio collection with respect to a specific direction toward one of the members who made the specific gesture in order to record audio data; and d) controlling, by the processor, the data storage to store the audio data and a time stamp associated with the audio data as an entry of conversation record.

Another object of the disclosure is to provide a system that is capable of implementing the above-mentioned method.

According to one embodiment the disclosure, the system for recording audio content in a group conversation among a plurality of members includes an image capturing device, an audio recording device, a data storage, and a processor communicating with the image capturing device, the audio recording device and the data storage. The processor is programmed to:

control the image capturing device to continuously capture images of the members;

execute an image processing procedure on the images of the members to determine whether a specific gesture is detected;

when the determination is affirmative, control the audio recording device to activate and perform unidirectional audio collection with respect to a specific direction toward one of the members who made the specific gesture in order to record audio data; and control the data storage to store the audio data and a time stamp associated with the audio data as an entry of conversation record.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
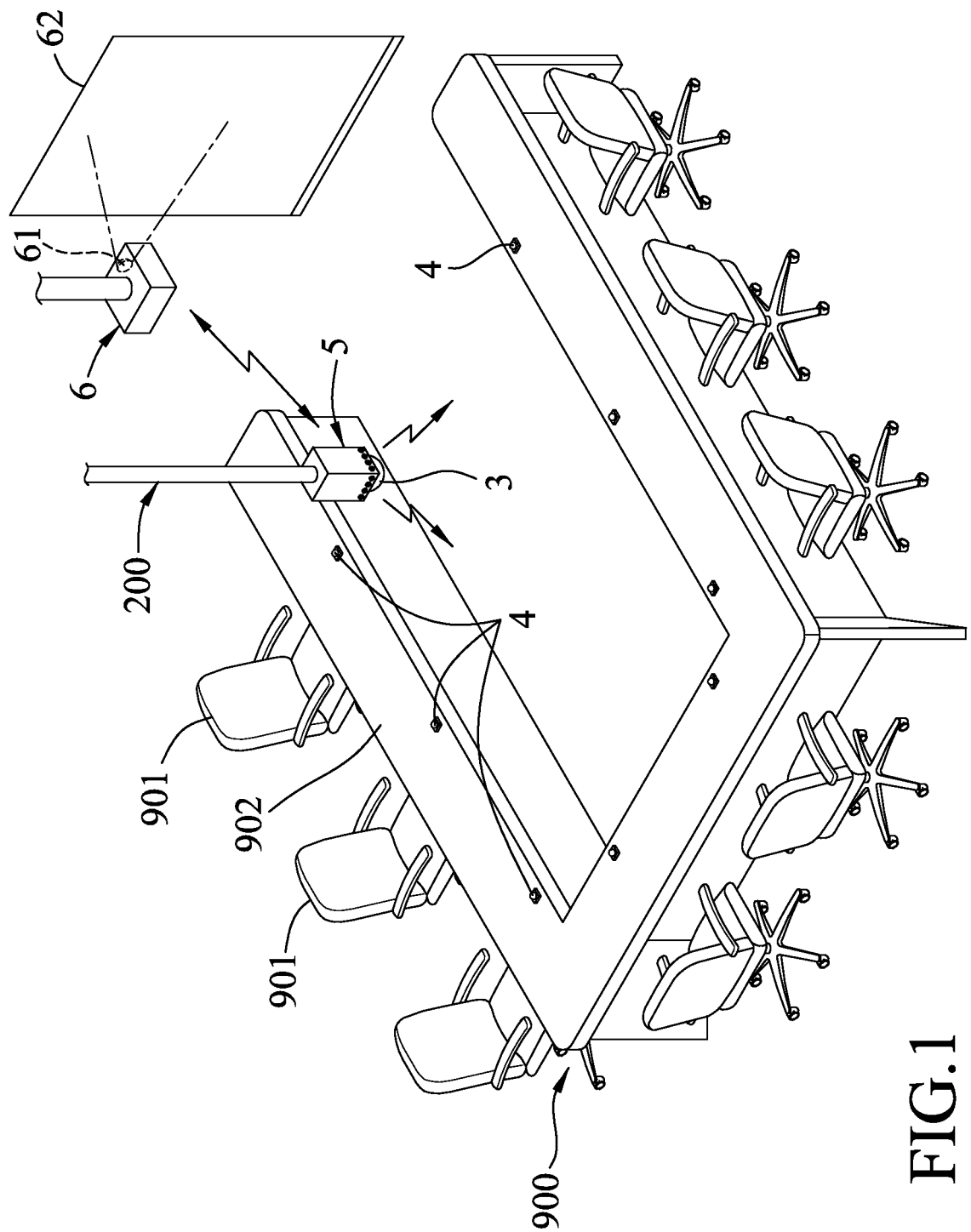
FIG. 1 is a schematic diagram for illustrating a system for recording audio content in a group conversation according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

FIG. 1 is a schematic diagram illustrating a system 200 for recording audio content in a group conversation according to one embodiment of the disclosure. The system 200 is placed in a conference room 900 that includes a plurality of seats 901 and a table 902 in this embodiment, and may be placed in other locations in various embodiments.

Figure 2:
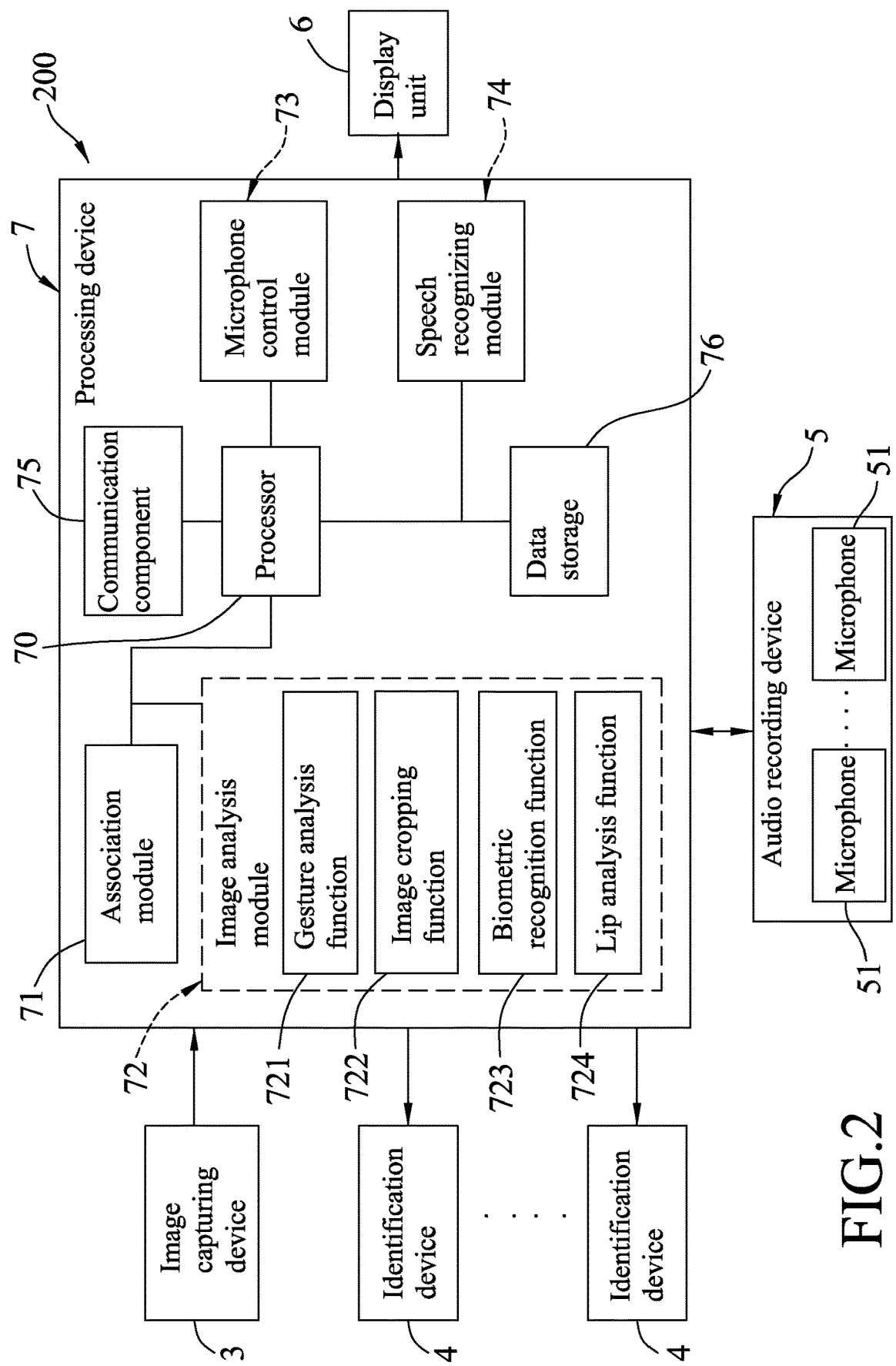
FIG. 2 is a block diagram illustrating components of the system according to one embodiment of the disclosure.

FIG. 2 is a block diagram illustrating components of the system 200 according to one embodiment of the disclosure. In this embodiment, the system 200 includes a processing device 7, an image capturing device 3, a plurality of identification devices 4, an audio recording device 5, and a display unit 6.

The image capturing device 3 may be embodied using a camera that is capable of capturing images covering parts or the entirety of the conference room 900, and may be configured to turn to face a specific direction toward one of the seats 901.

The plurality of identification devices 4 may be disposed on the table 902, and are to be associated with the seats 901, respectively. In this embodiment, the identification devices 4 are disposed in front of the seats 901, respectively. Each of the identification devices 4 may include an output unit (such as a lighting component) and an input interface (such as a button).

In some embodiments, the identification devices 4 may be distributed to a plurality of members participating in the group conversation for each member to wear a corresponding one of the identification devices.

Figure 3:
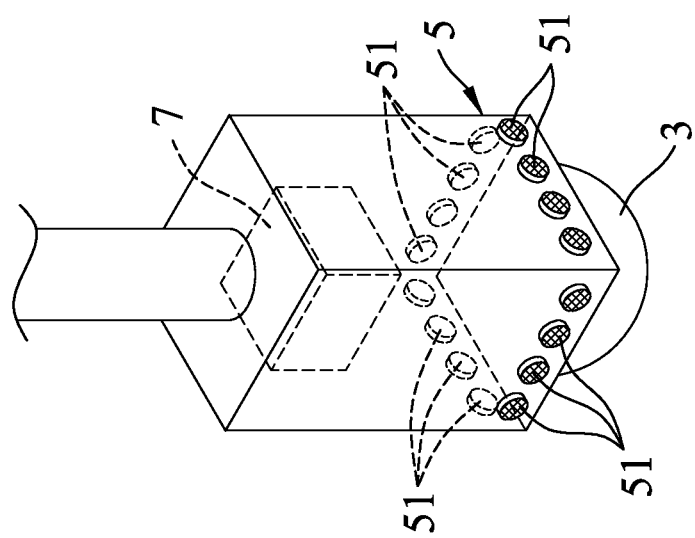
FIG. 3 is a partial schematic diagram of the system, illustrating a configuration of an image capturing device and an audio recording device.

The audio recording device 5 may include one or more microphones 51, and is integrated with the image capturing device 3 in this embodiment. Specifically, referring further to FIG. 3, the image capturing device 3 and the microphones 51 of the audio recording device 5 are hung from a ceiling of the conference room 900 using an arm.

In use, the audio recording device 5 may be controlled to operate in one of an omni-direction mode and a specific-direction mode. In the omni-direction mode, all microphones 51 may be activated so as to collect audio from all directions. In the specific-direction mode, some of the microphones 51 may be selectively activated so as to perform unidirectional audio collection (i.e., collecting audio in a specific direction) using beamforming technique.

The display unit 6 may be embodied using a projector 61 that is capable of projecting images on a surface 62. In other embodiments, the display unit 6 may be embodied using a display panel (e.g., a liquid-crystal display (LCD) screen).

The processing device 7 includes a processor 70, a communication component 75 and a data storage 76.

The processor 70 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), and/or a radio-frequency integrated circuit (RFIC), etc.

The communication component 75 may include a short-range wireless communication module supporting a short-range wireless communication network using a wireless technology of Bluetooth® and/or Wi-Fi, etc., and a mobile communication module supporting telecommunication using Long-Term Evolution (LTE), the third generation (3G) and/or fourth generation (4G) of wireless mobile telecommunications technology, and/or the like. Via the communication component 75, the processing device 7 is configured to communicate with other components of the system 200 (i.e., the image capturing device 3, the identification devices 4, the audio recording device 5 and the display unit 6).

The data storage 76 may be embodied using one or more of a hard disk, a solid-state drive (SSD) and other non-transitory storage medium. In this embodiment, the data storage 76 stores a number of modules in the form of software instructions. When executed by the processor 70, the modules may cause the processor 70 to perform operations as described below.

Specifically, in this embodiment, the data storage 76 stores an association module 71, an image analysis module 72, a microphone control module 73 and a speech recognizing module 74.

Figure 4:
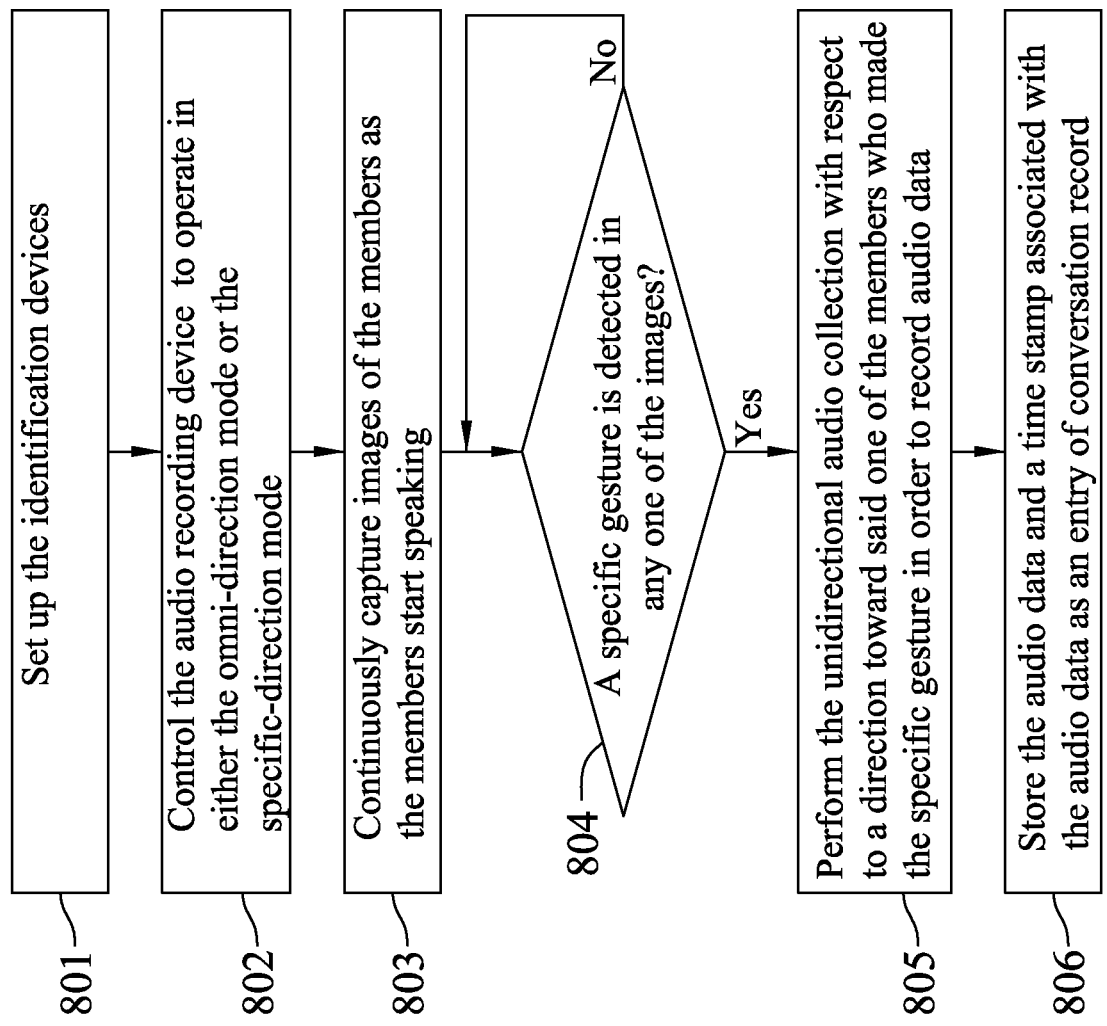
FIG. 4 is a flowchart illustrating steps of a method for recording audio content in a group conversion according to one embodiment of the disclosure.

FIG. 4 is a flowchart illustrating steps of a method for recording audio content in a group conversion according to one embodiment of the disclosure. In this embodiment, the method is implemented using the system 200 as described above.

In step 801, prior to the start of the group conversion, the identification devices 4 are first set up. Specifically, the identification devices 4 may be disposed on the table 902 to correspond with the seats 901 (on which the members are seated), respectively. Alternatively, the identification devices 4 may be worn by the members of the group conversation, respectively.

Then, a person may operate the processing device 7 such that the processor 70 controls the communication component 75 to establish a communication with each of the identification devices 4, and executes the association module 71 to, for each of the identification devices 4, associate a unique profile of the corresponding one of the members (who is wearing or sitting behind the identification device 4) to the identification device 4.

For each of the members, the profile thereof may include a personal identification dataset and a biometric identification dataset of the member. The personal identification dataset may include a name and a title of the member, and a picture of the member. The personal identification dataset may be pre-stored in the data storage 76 or inputted via an input interface (such as a keyboard/mouse) of the processing device 7.

The biometric identification may include facial features, bodily features, or other biometrically unique features of the member.

In step 802, a person operates the processing device 7 to control the audio recording device 5 to operate in either the omni-direction mode or the specific-direction mode. Specifically, the processor 70 may operate to execute the microphone control module 73, so as to individually activate or deactivate the microphones 51 of the audio recording device 5. In this embodiment, the audio recording device 5 is first controlled to operate in the specific-direction mode.

In step 803, after the group conversion commences, a person may operate the processing device 7 to control the image capturing device 3, so as to continuously capture images of the members as the members start speaking.

In step 804, the processor 70 executes an image processing procedure on the images of the members to determine whether a specific gesture is detected in any one of the images.

Specifically, the processor 70 executes the image analysis module 72 to execute the image processing procedure on the images to determine, for each of the members, whether the member has made a specific gesture. In this embodiment, the image analysis module 72 includes a gesture analysis function 721 for determining gestures of the member. The specific gesture may be a raised hand which indicates that he/she is about to speak, and may be other gestures such as wave of a hand, standing up, etc. In use, the gesture analysis function 721 may include specific imaging parameters associated with each of multiple specific gestures, and is capable of identifying the specific gestures in the images.

When it is determined that a specific gesture made by one of the members is detected, the flow proceeds to step 805, in which the processor 70 controls the audio recording device 5 to operate in the specific-direction mode to perform the unidirectional audio collection with respect to a direction toward said one of the members who made the specific gesture in order to record audio data. More specifically, when it is determined that one of the members has, e.g., raised his/her hand, the processor 70 executes the microphone control module 73, so as to activate some of the microphones 51 of the audio recording device 5 for recording the audio data coming from the direction toward the member with the raised hand, based on a position of the specific gesture in the images. In some embodiments, when it is determined that the specific gesture made by one of the members is detected, the processor 70 further determine the direction toward the member based on the position of the specific gesture in the images.

It is noted that in some embodiments, in addition to controlling the audio recording device 5 to perform the unidirectional audio collection, the processor 70 may further control one of the identification devices 4 that is associated with the one of the members (the one with the raised hand) to output a perceivable output.

In the cases that the identification devices 4 each include the output unit (such as a lighting component), the processor 70 may control the lighting component of the one of the identification devices 4 to be activated to indicate that the corresponding member is about to speak or is speaking.

Specifically, the image analysis module 72 may include a biometric recognition function 723 for identifying the member who is speaking using the biometric features identified in the images and the biometric identification datasets stored in the data storage 76, and to control the output unit of the corresponding one of the identification devices 4 to output the perceivable output. For example, the image analysis module 72 is configured to identify the member by comparing the biometric features identified in the images to the biometric identification datasets stored in the data storage 76.

In some embodiments, while the unidirectional audio collection is being performed, the processor 70 may further control the display unit 6 to display images of the one of the members who is speaking.

For example, the image analysis module 72 may include an image cropping function 722 for generating an edited image that focuses on the one of the members from each of the images captured by the image capturing device 3 (with a majority of other members cropped out from the image). Then, the processor 70 controls the display unit 6 to display the edited images respectively from the images captured by the image capturing device 3.

After it is determined that said one of the members has stopped speaking, the flow proceeds to step 806.

A number of ways may be employed to determine that said one of the members has stopped speaking. In some embodiments, after step 805, the processor 70 executes the image processing procedure on the images of the members to determine whether the lips of the one of the members are moving. Specifically, the image analysis module 72 may include a lip analysis function 724 for performing such determination.

When it is determined that the lips of the one of the members has stopped moving for a predetermined time period (e.g., 5 seconds), the processor 70 controls the audio recording device 5 to discontinue the unidirectional audio collection.

In some embodiments, said one of the members may operate the input interface of the corresponding identification device 4 (e.g., pressing the button) to generate a user input signal which may be transmitted to the processing device 7. In response to receipt of the user input signal from the one of the identification devices 4 associated with the one of the members, the processor 70 controls the audio recording device 5 to discontinue the unidirectional audio collection. In the case that the edited images of the one of the members are displayed by the display unit 6, the user input signal may be used to trigger the processor 70 to control the display unit 6 to stop displaying the edited images of the one of the members.

In step 806, the processor 70 controls the data storage 76 to store the audio data and a time stamp associated with the audio data as an entry of conversation record. The time stamp may be obtained from a timer component (not depicted in the drawings) or from an online source.

In the cases where the identification of the one of the members has been determined, the entry of conversation record stored by the data storage 76 may further include the identification dataset of the one of the members.

In some embodiments, the processor 70 may execute the speech recognizing module 74 to perform a speech recognition procedure to obtain a text file from the audio data. Afterward, the entry of conversation record stored by the data storage 76 may further include the text file in the entry of conversation record.

In some embodiments, during the group conversation, a user-input command may be inputted by a person into the processing device 7 to control the audio recording device 5 to switch to the omni-direction mode. In response to the command, the processing device 7 controls the audio recording device 5 to activate and perform omni-directional audio collection with respect to all directions in order to record the audio data. Specifically, all microphones 51 of the audio recording device 5 may be activated.

After step 806, the flow may go back to step 803 to determine whether another one of the members makes a specific gesture, and steps 803 to 806 may be performed repeatedly for the duration of the group conversation to obtain more entries of conversation record. After the group conversation comes to an end, a complete conversation record including the entries of conversation record may be stored in the data storage 76.

It is noted that when it is determined that a plurality of specific gestures are detected (e.g., more than one member raised their hands), the processor 70 may select one of the members making the specific gesture based on a predetermined rule, such as a chronological order of the members making the specific gesture. Afterward, the processor 70 executes steps 804 to 806 with respect to the selected one of the members, and then executes steps 804 to 806 with respect to a next one of the members in the chronological order.

To sum up, the embodiments of the disclosure provide a method and a system for recording audio content in a group conversation among a plurality of members. By focusing the recording of the audio data on the member who is speaking, quality of the resultant audio data may be improved over that recorded using the traditional omni-directional recording equipment. Furthermore, the improved quality of the audio data may be beneficial to performing the speech recognition process, resulting in a text file that more accurately reflects the content of the group conversation. The above-described method and system are therefore capable of reducing the human effort needed for creating the conversation record.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A system for recording audio content in a group conversation among a plurality of members, comprising:
an image capturing device;
an audio recording device;
a data storage; and
a processor communicating with said image capturing device, said audio recording device and said data storage;
wherein said processor is programmed to:
control said image capturing device to continuously capture images of the members;
execute an image processing procedure on the images of the members to determine whether a specific gesture is detected;
when the determination is affirmative, control said audio recording device to activate and perform unidirectional audio collection with respect to a specific direction toward one of the members who made the specific gesture in order to record audio data; and
control said data storage to store the audio data and a time stamp associated with the audio data as an entry of conversation record;
wherein said data storage stores, for each of the members, a profile that includes a personal identification dataset and a biometric identification dataset of the member, wherein:
the image processing procedure includes determining whether a specific gesture made by one of the members is detected, and identifying the one of the members using biometric features identified in the images and the biometric identification datasets respectively of the members; and
said processor is further programmed to control said data storage to store the personal identification dataset of the profile of the one of the members in the entry of conversation record;
the system further comprising a plurality of identification devices that communicate with said processor, wherein said processor is further programmed to:
prior to controlling said image capturing device to continuously capture images of the members, associate each of said identification devices with a profile corresponding with one of the members; and
while controlling said audio recording device to perform the unidirectional audio collection, control one of said identification devices associated with the profile of the one of the members to output a perceivable output;
wherein said processor is further programmed to, while controlling said audio recording device to perform the unidirectional audio collection, in response to receipt of a user input signal from the one of the identification devices associated with the profile of the one of the members, control said audio recording device to discontinue the unidirectional audio collection.

2. The system of claim 1 wherein:
the image processing procedure performed by said processor further includes determining whether lips of the one of the members are moving; and
when it is determined that the lips of the one of the members has stopped moving for a predetermined time period, said processor is programmed to control said audio recording device to discontinue the unidirectional audio collection.

3. The system of claim 1, further comprising a display communicating with said processor, wherein said processor is further programmed to, while controlling said audio recording device to perform the unidirectional audio collection, control said display to display the images of the one of the members.

4. The system of claim 1, wherein said processor is further programmed to:
while controlling said audio recording device to perform the unidirectional audio collection,
execute a speech recognition procedure to obtain a text file from the audio data; and
control said data storage to further store the text file in the entry of conversation record.

5. The system of claim 1, wherein said processor is further programmed to, while controlling said audio recording device to perform the unidirectional audio collection:
in response to a user-input command to switch to an omni-direction mode, control said audio recording device to activate and perform omni-direction audio collection with respect to all directions in order to record the audio data.

6. A method for recording audio content in a group conversation among a plurality of members, the method being implemented by a system that includes a processor, an image capturing device, an audio recording device and a data storage, the data storage storing, for each of the members, a profile that includes a personal identification dataset and a biometric identification dataset of the member, the system further including a plurality of identification devices that communicate with the processor, the method comprising steps of:
a) controlling, by the processor, the image capturing device to continuously capture images of the members;
b) executing, by the processor, an image processing procedure on the images of the members to determine whether a specific gesture is detected;
c) when the determination of step b) is affirmative, controlling, by the processor, the audio recording device, to activate and perform unidirectional audio collection with respect to a specific direction toward one of the members who made the specific gesture in order to record audio data; and
d) controlling, by the processor, the data storage to store the audio data and a time stamp associated with the audio data as an entry of conversation record;
wherein:
the image processing procedure of step b) includes determining whether a specific gesture made by one of the members is detected, and identifying the one of the members using biometric features identified in the images and the biometric identification datasets respectively of the members; and
step d) includes controlling the data storage to further store the personal identification dataset of the profile of the one of the members in the entry of conversation record;
the method further comprising, prior to step a), a step of associating, by the processor, each of the identification devices with a profile corresponding with one of the members;

wherein step c) further includes
controlling one of the identification devices associated with the profile of the one of the members to output a perceivable output; and
in response to receipt of a user input signal from the one of the identification devices associated with the profile of the one of the members, controlling the audio recording device to discontinue the unidirectional audio collection.

7. The method of claim 6, wherein:
the image processing procedure of step b) further includes determining whether lips of the one of the members are moving; and
step c) further includes, when it is determined that the lips of the one of the members has stopped moving for a predetermined time period, controlling the audio recording device to discontinue the unidirectional audio collection.

8. The method of claim 6, the system further including a display communicating with the processor, wherein step c) further includes controlling, by the processor, the display to display the images of the one of the members.

9. The method of claim 6, further comprising, after step c):
executing, by the processor, a speech recognition procedure to obtain a text file from the audio data;
wherein step d) includes the data storage further storing the text file in the entry of conversation record.

10. The method of claim 6, wherein step c) includes:
in response to a user-input command to switch to an omni-direction mode, controlling, by the processor, the audio recording device to activate and perform the omni-direction audio collection with respect to all directions in order to record the audio data.

\* \* \* \* \*